(12) United States Patent
Biskeborn

(10) Patent No.: US 7,195,189 B2
(45) Date of Patent: Mar. 27, 2007

(54) TAPE SYSTEM WITH AN ISOLATED LOAD/UNLOAD TAPE PATH

(75) Inventor: Robert Glenn Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 11/049,203

(22) Filed: Feb. 1, 2005

(65) Prior Publication Data

US 2006/0175452 A1    Aug. 10, 2006

(51) Int. Cl.
*G11B 15/66* (2006.01)
(52) U.S. Cl. .............. 242/332.1; 242/346.1; 242/532.7; 360/69
(58) Field of Classification Search ............. 242/332, 242/332.1, 332.3, 332.4, 346, 346.2, 532.7, 242/346.1; 360/69, 85, 95, 96.1, 96.3
See application file for complete search history.

(56) References Cited

U.S. PATENT DOCUMENTS

| | | | |
|---|---|---|---|
| 4,315,287 A * | 2/1982 | Noguchi | 360/95 |
| 4,577,811 A * | 3/1986 | Bray et al. | 242/332.1 |
| 4,582,235 A | 4/1986 | Schulz | 226/20 |
| 4,583,137 A | 4/1986 | Ogiro et al. | 360/85 |
| 4,941,620 A * | 7/1990 | Wilsch et al. | 242/532.7 |
| 5,173,828 A | 12/1992 | Tanzer et al. | 360/130.21 |
| 5,414,585 A | 5/1995 | Saliba | 360/130.21 |
| 5,739,976 A * | 4/1998 | Sakai et al. | 360/85 |
| 6,381,096 B1 * | 4/2002 | Collins | 242/346.1 |
| 6,700,733 B1 | 3/2004 | Biskeborn | 360/90 |
| 6,865,047 B2 * | 3/2005 | Maekawa et al. | 360/69 |
| 6,886,766 B1 * | 5/2005 | Weng et al. | 242/346.1 |

* cited by examiner

*Primary Examiner*—William A. Rivera
(74) *Attorney, Agent, or Firm*—William D. Gill; Jeffrey P. Aiello

(57) ABSTRACT

A tape recording system is provided having an improved load/unload path, the system comprising a first pair of guides and a second pair of guides movable from an unloaded position to a loaded position. In the unloaded position, a gap between the first pair of guides and the second pair of guides provides a path for loading a tape from a supply reel to a take-up reel without contacting any of the first pair of guides, the second pair of guides and the head assembly to prevent contamination and damage of these components. The tape loader path is isolated from the head by the first pair of guides providing protection of the head from possible contact damage by the loader mechanism and tape leader.

16 Claims, 5 Drawing Sheets

TAPE SYSTEM WITH AN ISOLATED LOAD/UNLOAD TAPE PATH

BACKGROUND OF THE INVENTION

1. Field of the Invention

The invention relates to the field of recording tape transport mechanisms and more particularly to an isolated load/unload tape path and means for supporting and positioning the tape in relation to the tape head.

2. Description of the Related Art

Magnetic tape storage systems are widely used in computer systems for storing and retrieving large amounts of data. Current systems typically read and write from parallel tracks on the tape which vary in number based on the design of the system. Each track of the head has a read and a write magnetic transducer (head) arranged in tandem so that the data written by the write head can be verified by the read head. The head pairs may be alternated so that one set one set of the tracks are written and read when the tape travels in one direction and the other set is used when the tape is moving in the opposite direction.

For high density recording the tape must be precisely positioned and tensioned as it moves across the head assembly. The tape is typically supported and positioned by support surfaces, for example cylindrical rollers or posts or guides disposed on each side of the head. The support surfaces are positioned typically next to the head to form the wrap angles which are the angles of the plane of the tape with respect to the air bearing surfaces of the head. Precise wrap angles are necessary for optimum performance. In present linear tape systems, the tape guides and the head are configured to be on the same side of the tape providing an unrestricted path for threading the tape during the tape loading process. However, this configuration means that the front surface (recording surface) of the tape contacts the guides. During tape loading, the tape leader typically contacts the guides and the head assembly exposing them to contamination and physical damage. Furthermore, geometrical considerations generally limit how much the tape wraps the guides. Rollers with insufficient wrap slip relative to the tape, thus adversely affecting tape guiding.

Therefore, there is an ongoing need for improved tape support and positioning systems that prevent damage to the recording head during tape load/unload operations and that provide precise stability and tracking of the tape relative to the recording head during operation.

SUMMARY OF THE INVENTION

In accordance with the principles of the present invention, there is disclosed a tape recorder drive system comprising a first pair of guides disposed on either side of the head and a second pair of guides also disposed on either side of the head that are movable between loaded and unloaded positions. In the unloaded position, a gap between the first pair of guides and the second pair of guides provides a path for loading a tape from a supply reel to a take-up reel without contacting any of the first pair of guides, the second pair of guides and the head assembly to reduce contamination and damage to these components. The guides may be rollers, posts, air bearings or other tape guides, or may be combinations of any of these tape guides.

In the loaded position the tape wraps the first and second pair of guides by an angle greater than approximately 40° greatly reducing tape slip when rollers are used as the tape guides. The second pair of guides contact the back side (nonrecording side) of the tape.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1:
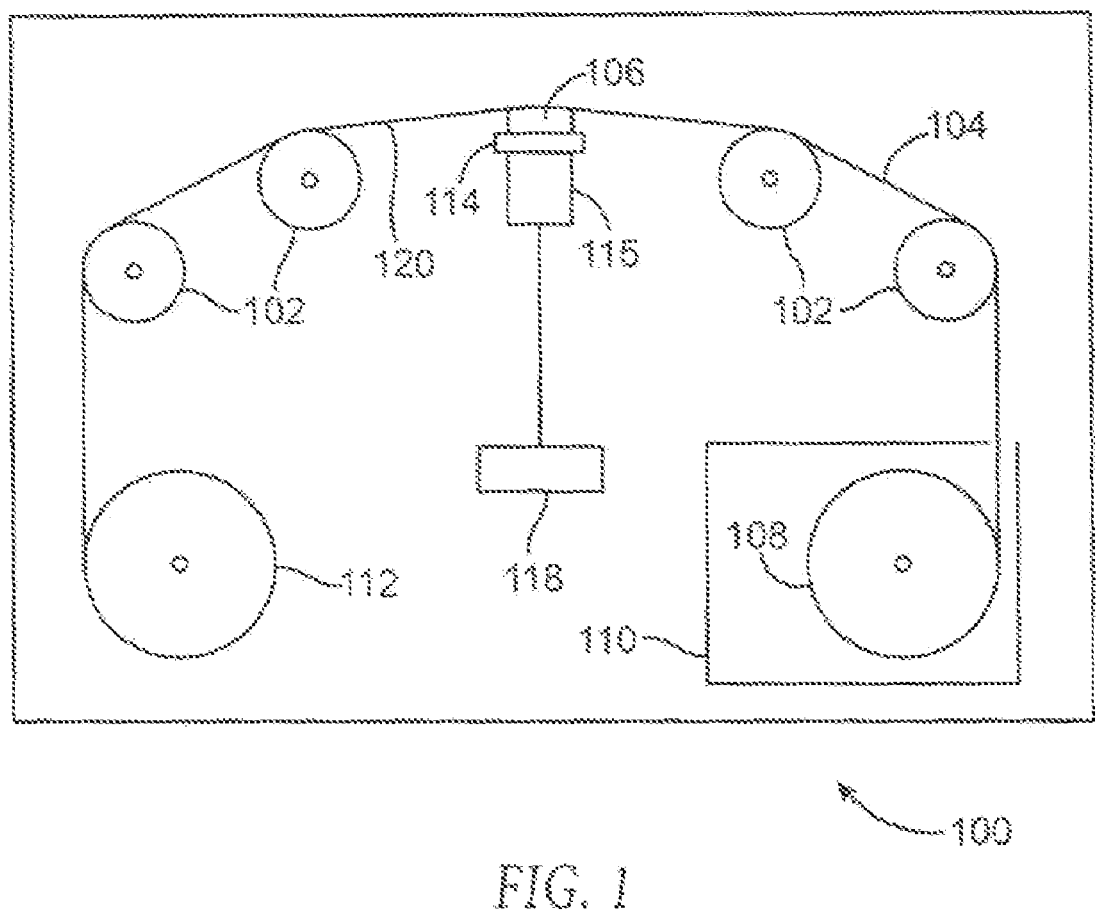
FIG. 1 is a simplified plan view, not to scale, of a tape drive.

FIG. 1 illustrates a tape drive 100 having a system of guides 102 for guiding and positioning a recording tape 104 over a head assembly 106. The recording tape 104 is wound on a supply reel 108 enclosed in a tape cartridge 110 that is mounted in the tape drive 100. To load the recording tape 104, a tape leader attached to a free end of the tape 104 is directed by a tape loading mechanism from a supply reel 108 enclosed in a tape cartridge 110 over the guides 102 and head assembly 106 to a take-up reel 112. The position of the guides 102 may have limited motion to enable setting the desired wrap of the tape over the head for optimum read and write operation. During operation, the tape 104 moves in either direction between the supply reel 108 and the take-up reel 112. The head assembly 106 is mounted on an actuator 114 controlled by a servo system 116 for accessing data tracks recorded on the tape. The read and write signals to and from the head assembly are processed by a read/write channel 118. During the tape loading process, the leader typically contacts the system of guides 102 and the head assembly 106 exposing these elements to physical damage and contamination from the leader tape, the splice, the splice glue and the loading mechanism. With this guide configuration, the guides 102 contact a front side (recording side) 120 of the tape 104.

Figure 2A:
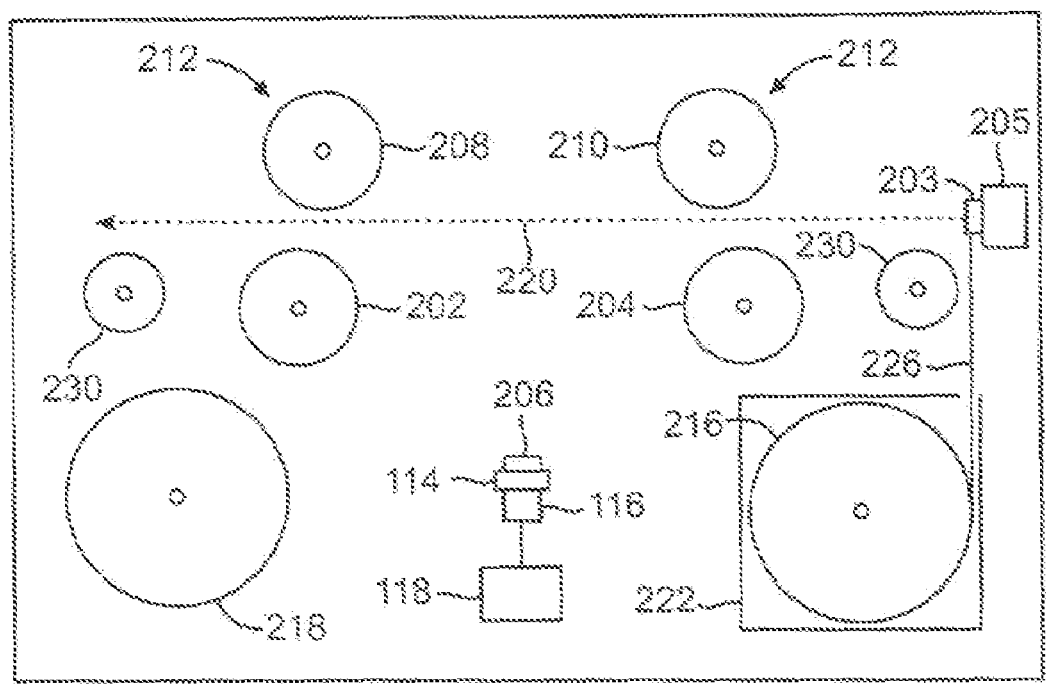
FIG. 2a is a plan view, not to scale, of an embodiment of a tape drive incorporating the present invention shown in the unloaded state.
Figure 2B:
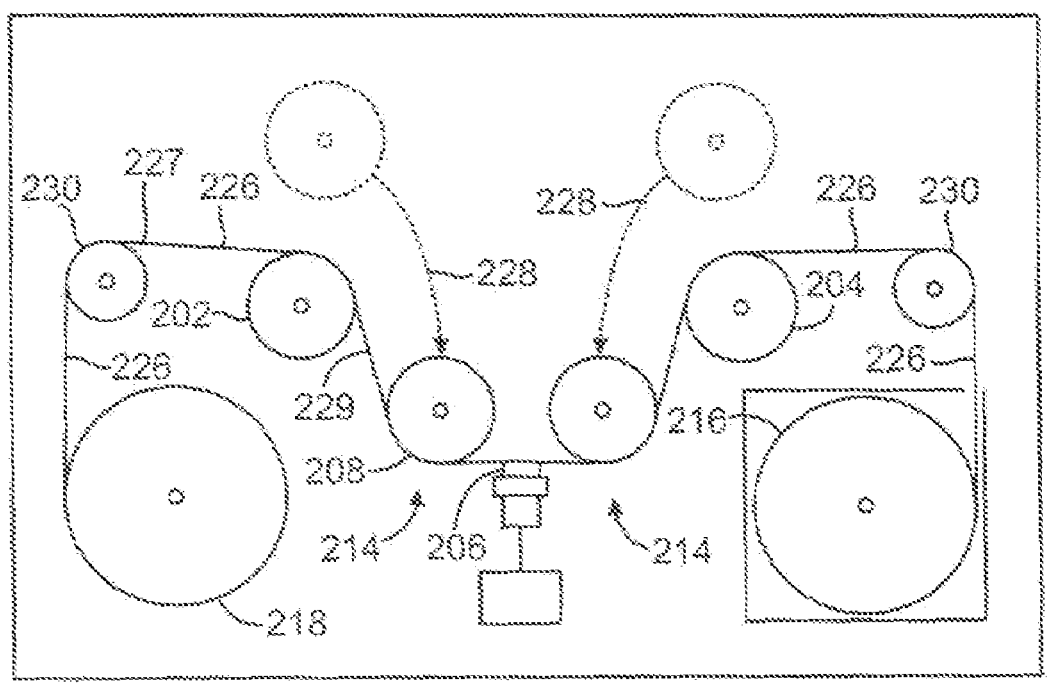
FIG. 2b is a plan view, not to scale, of the tape drive of FIG. 2a shown in the loaded state.

FIGS. 2a and 2b illustrate an embodiment of a tape drive system 200 using a tape loading path and tape drive guide system according to the present invention. A first pair of rollers 202 and 204 are located in fixed positions relative to the head assembly 206. A second pair of rollers 208 and 210 are movable relative to the head assembly from an unloaded position 212 in the unloaded state shown in FIG. 2a to a loaded position 214 in the loaded state shown in FIG. 2b. To load a tape, the movable rollers 208 and 210 are positioned in the unloaded state and a tape leader 203 is directed by a tape loader mechanism 205 from the supply reel 216 enclosed in tape cartridge 222 to the take-up reel 218 along a tape loader path 220 avoiding contact with head assembly 206 and the rollers 202, 204, 206 and 210. The tape loader path 220, indicated by a dashed line, lies in the plane separating rollers 202 and 204 from rollers 208 and 210 when in the unloaded positions shown in FIG. 2a. The tape loader path 220 is isolated from the head by rollers 202 and 204 providing protection of the head from possible contact damage by the loader mechanism and tape leader. The tape loading process is completed by moving the movable rollers 208 and 210 to the second position 214 shown in FIG. 2b. The rollers 208 and 210 are moved from the unload position 212 (shown in phantom) to the loaded position 214 along the circular paths 228 indicated by dashed arrows. Rotary mechanisms (not shown) suitable for moving the rollers are known to the art. In the loading process, the rollers 208 and 210 engage the back surface (nonrecording surface) 227 of the tape 226 and press the front surface (recording surface) 229 of the tape into wrapping contact with fixed rollers 202 and 204 and the head assembly 206. In the loaded state, the tape 104 wraps each of the rollers 202, 204, 208 and 210 preferably by 40 or more, and most preferably by 90°–180° or more. One or more additional pins, rollers or guides 230 may be optionally inserted in the tape path between the supply reel 216 and fixed roller 204 and between fixed roller 202 and the take-up reel 218 as needed to guide the tape to and from the reels. The additional guides 230 may be placed to allow the tape to be wound with either the back or the front side of the tape on the outside of the supply and take-up reels as desired. The tape loader mechanisms 205 for directing a tape leader 203 fixed to an end of the tape 226 along a tape loader path 220 from the supply reel to the take-up reel are well known to the those skilled in the art. Alternatively, the rollers 202, 204, 208 and 210 may be posts, air bearings or other tape guides known to the art, or may be combinations of any of these tape guides.

In FIGS. 2a and 2b, the fixed rollers 202, 204 and the movable rollers 208, 210 have been shown having the same diameters. The fixed and movable rollers may have any diameter and may be smaller or larger in diameter relative to each other. However, it is preferable for the two fixed rollers to have equal diameters and also for the two movable rollers to have equal diameters to provide symmetry for forward and backward directions of tape motion with respect to the head assembly 206.

Figure 3:
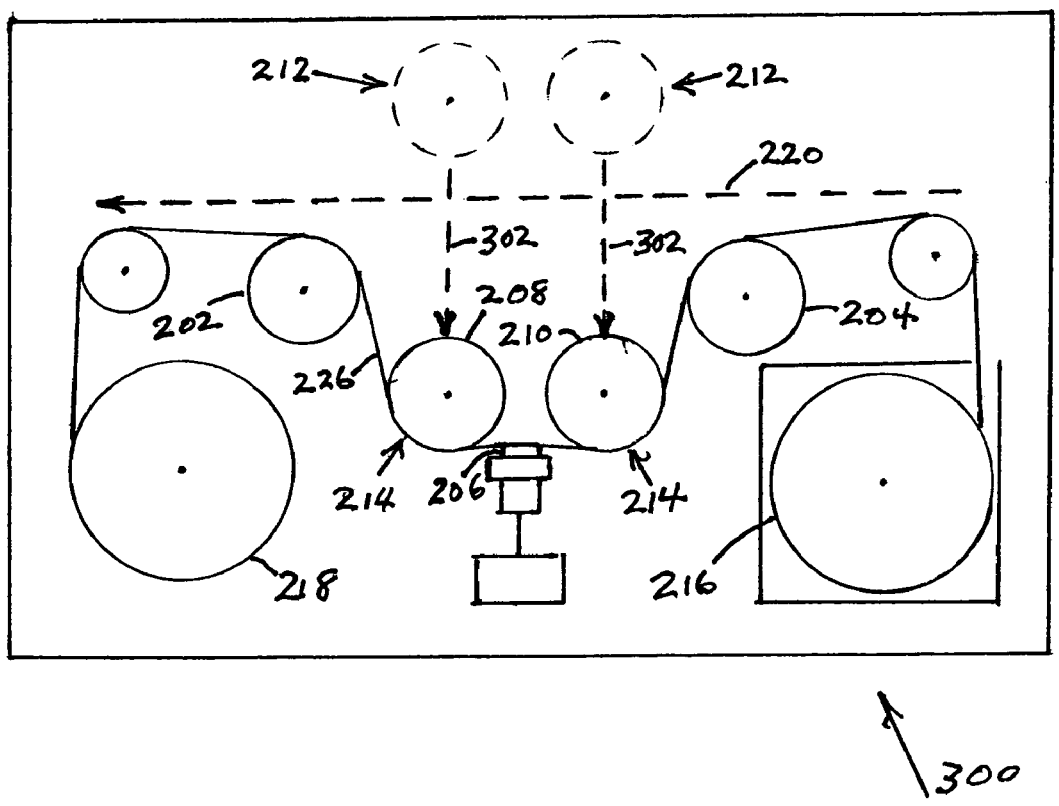
FIG. 3 is a plan view, not to scale, of an embodiment of a tape drive of the present invention having a linear motion of a first pair of rollers in the tape load process.

The embodiment of the invention illustrated in FIGS. 2a and 2b described moving the rollers 208 and 210 from unloaded positions 212 to loaded positions 214 along circular paths 228 using rotary mechanisms (not shown). FIG. 3 shows another embodiment of a tape drive system 300 using a tape loader path and tape drive roller system according to the present invention. The tape drive system 300 differs from the tape drive system 200 only in using a linear mechanism (not shown) to move the rollers 208 and 210 from unloaded positions 212 (shown in phantom) to loaded positions 214 along linear paths 302 indicated by the dashed arrows. It will be apparent to those skilled in the art that, alternatively, other mechanisms may be used to move the rollers 208 and 210 between the unloaded and loaded positions.

Figure 4:
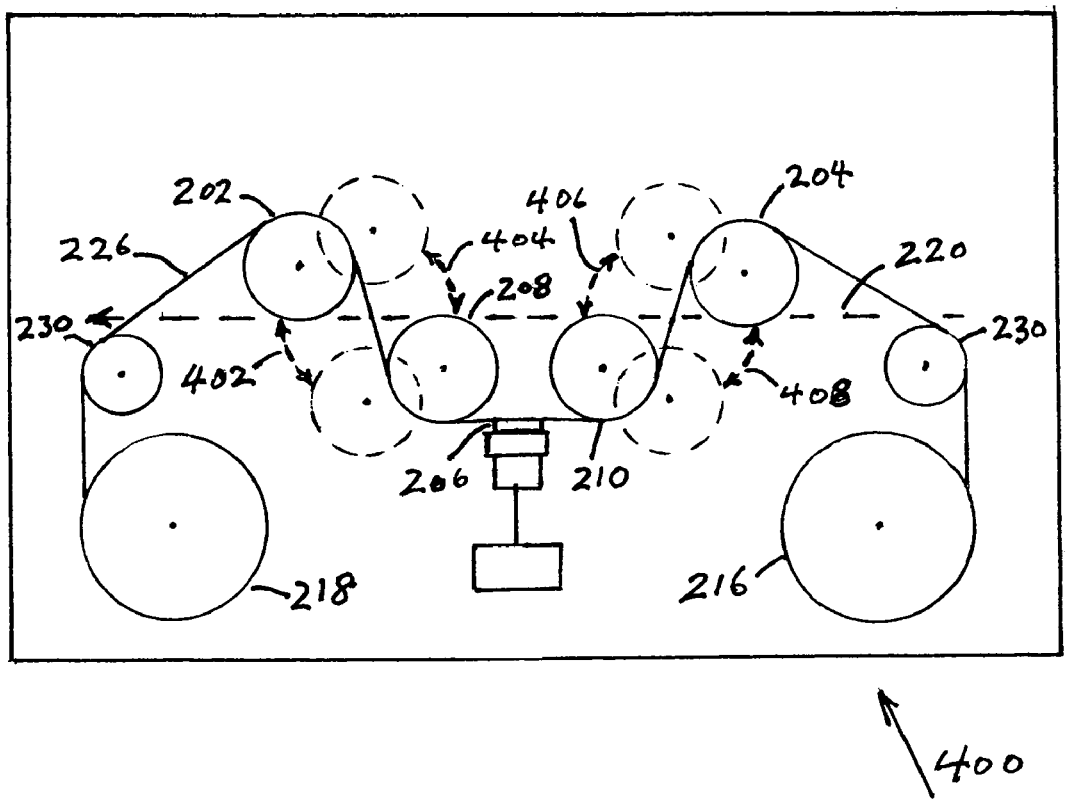
FIG. 4 is a plan view, not to scale, of an embodiment of a tape drive of the present invention using a rotary motion to position a first and second pair of rollers in the tape load process.

Although, in the embodiments described above with reference to FIGS. 2a, 2b and 3, the positions of rollers 202 and 204 have been fixed with respect to the head assembly, this is not a requirement of the invention. FIG. 4 shows another embodiment of a tape drive system 400 using a tape loader path and tape drive roller system according to the present invention. The tape drive system 400 differs from the tape drive system 200 only in using a rotary mechanism (not shown) to rotate the positions of rollers 202 and 208 together between the loaded positions and the unloaded positions (shown in phantom) along the circular paths 402 and 404, respectively, indicated by the dashed arrows. Similarly, a rotary mechanism (not shown) is used to rotate the positions of rollers 204 and 210 together between the loaded and unloaded (shown in phantom) positions along the circular paths 406 and 408, respectively, indicated by the dashed arrows. The tape loader path 220 for this embodiment is indicated by a dashed line in a plane in the gap separating rollers 202 and 204 from rollers 208 and 210 when in the unloaded positions (shown in phantom).

Figure 5:
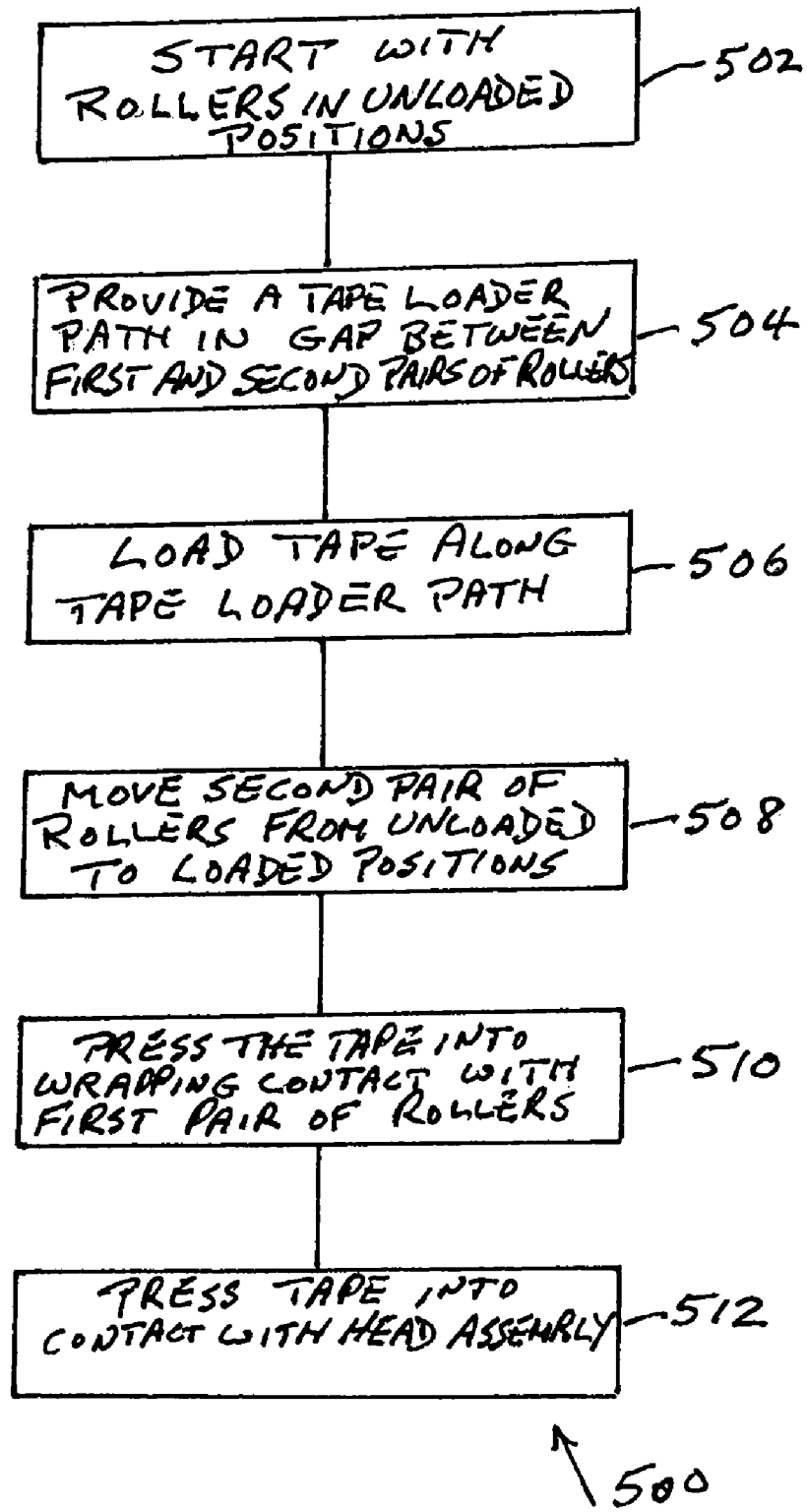
FIG. 5 is a flow chart of a tape loading process according to the invention.

FIG. 5 is a flow chart of a tape loading process 500 according to the present invention. In step 502, the tape loading process starts with the rollers 208 and 210 in the unloaded positions 212. In step 504, a tape loader path 220 is provided in a gap separating the first pair of rollers 202, 204 from the second pair of rollers 208, 210. In step 506, a tape leader 203 fixed to an end of the tape 226 is directed by a tape loader mechanism 205 along the tape loader path 220 from the supply reel 216 to the take-up reel 218. In step 508, the second pair of rollers 208, 210 are moved from the unloaded positions 212 to the loaded positions 214 engaging the back surface 227 of the tape 220 and, in step 510, pressing the front surface 229 of the tape into wrapping contact with the first pair of rollers 202 and 204. Finally, in step 512 the tape loading process is completed when rollers 208 and 210 in the fully loaded positions 214 press the front surface 229 of the tape 220 into contact with the head assembly 206 forming a desired wrap angle at the head assembly.

The present invention provides a number of advantages over the prior art. First, with the rollers 208 and 210 moved to the unloaded positions 212, a direct clear path 220 is provided for the loading mechanism to carry the leader at the tape end from the supply reel 216 to the take-up reel 218 without contacting the head assembly and the critical rollers that provide tape guidance and tension. The tape loader path 220 is isolated from the head by rollers 202 and 204 providing protection of the head from possible contact damage by the loader mechanism and tape leader. Avoidance of possible contamination and damage to these components during the loading and unloading processes of tapes is very important. Second, by providing a tape loading path along a plane between positions of the rollers 202, 204 and the unloaded positions of rollers 208, 210, the loaded tape wraps each roller by a much greater angle than found in most linear drive tape paths. This tape wrap which may be 90° or more greatly reduces tape-roller slip which can introduce unwanted tension waves. Third, the free span of tape between the rollers may be made very short enhancing overall tape path stability. Fourth, since the actuator and head support mechanism is not positioned between the rollers 208 and 210, i.e. only the tape contact part of the head resides in this span, the span between the rollers 208 and 210 is very short improving head-tape interface stability by improving control of tape motion in both the transverse and lateral directions. Fifth, the rollers 208 and 210 contact the back side (nonrecording side) of the tape allowing a means to control undesirable tape charging by providing a path for grounding or biasing the tape. Sixth, the rollers push the tape against the head assembly such that the curvature of the tape on the rollers tends to iron out the tape at its edges helping to reduce edge loss. Finally, the positions of the rollers 208 and 210 can be easily adjusted for achieving the desired wrap angle at the head assembly 206.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

I claim:

1. A tape recorder system, comprising:
a head assembly;
a first pair of guides for supporting a tape; and
a second pair of guides movable from an unloaded position to a loaded position, the second pair of guides separated by a gap from the first pair of guides when in the unloaded position, the gap providing a path along a plane for loading the tape from a supply reel to a take-up reel without contacting any of the first pair of guides, the second pair of guides, and the head assembly, the second pair of guides located on either side of the head assembly when in the loaded position to engage the tape into wrapping contact with the first pair of guides and with the head assembly, when in the loaded position, a free span of tape between the second pair of guides being short to provide tape-head interface stability.

2. The tape recorder system of claim 1 wherein at least one of the first and second pair of guides comprise rollers.

3. The tape recorder system of claim 1 wherein the second pair of guides move from the unloaded position to the loaded position along a curved path.

4. The tape recorder system of claim 1 wherein the second pair of guides move from the unloaded position to the loaded position along a linear path.

5. The tape recorder system of claim 1 wherein the tape in the loaded position is wrapped over the first and second pairs of guides by an angle equal or greater than 40°.

6. The tape recorder system of claim 1 wherein the tape in the loaded position is wrapped over the first and second pairs of guides by an angle in the range from greater than 40° to greater than 180°.

7. The tape recorder system of claim 1 wherein in the loaded position the second pair of guides contact a back surface of the tape and the first pair of guides and the head assembly contact a recording surface of the tape.

8. The tape recording system of claim 1 wherein the first pair of guides are in fixed positions relative to the head assembly.

9. The tape recording system of claim 1 wherein the first pair of guides and the second pair of guides are movable in going from the unloaded position to the loaded position.

10. A method of loading a tape in a tape recording system that includes a first pair of guides, a second pair of guides, and a head assembly, the method comprising:
positioning the second pair of guides in an unloaded position;
providing a tape loader path in a gap separating the first pair of guides from the second pair of guides in the unloaded position, the gap providing a direct path along a plane for loading the tape from a supply reel to a take-up reel without contacting any of the first pair of guides, the second pair of guides, and the head assembly;
loading the tape along the tape loader path from the supply reel to the take-up reel;
moving the second pair of guides from the unloaded position to a loaded position;
engaging a back surface of the tape with the second pair of guides and pressing a recording surface of the tape into wrapping contact with the first pair of guides; and
pressing the recording surface of the tape into contact with the head assembly by the second pair of guides.

11. The method of claim 10 wherein the recording surface of the tape is pressed into contact with the head assembly such that a curvature of the tape against the head assembly flattens the tape at its edges against the head assembly.

12. The method of claim 11 wherein the tape is flattened at its edges against the head assembly to reduce edge loss of the tape.

13. The method of claim 10 wherein the tape in the loaded position is wrapped over the first and second pairs of guides by an angle equal or greater than 40°.

14. The method of claim 10 wherein the tape in the loaded position is wrapped over the first and second pairs of guides by an angle in the range from greater than 40° to greater than 180°.

15. A tape recorder system, comprising:
a head assembly;
a first pair of guides for supporting a tape; and
a second pair of guides movable from an unloaded position to a loaded position, the second pair of guides separated by a gap from the first pair of guides when in the unloaded position, the gap providing a direct path along a plane for loading the tape from a supply reel to a take-up reel without contacting any of the first pair of guides, the second pair of guides, and the head assembly, the second pair of guides located on either side of the head assembly when in the loaded position to engage a recording surface of the tape into wrapping contact with the first pair of guides and with the head assembly, the recording surface of the tape press into contact with the head assembly to flatten the tape, a free span of tape between the second pair of guides being short to provide tape-head interface stability.

16. The tape recorder system of claim 15 wherein the recording surface of the tape is pressed into contact with the head assembly such that a curvature of the tape against the head assembly flattens the tape at its edges to reduce edge loss of the tape.

* * * * *